United States Patent [19]
Paulucci

[11] Patent Number: 5,968,570
[45] Date of Patent: Oct. 19, 1999

[54] FOLDED PASTRY PRODUCT

[76] Inventor: Jeno F. Paulucci, 201 W. 1st St., Sanford, Fla. 32771

[21] Appl. No.: 08/832,740

[22] Filed: Apr. 4, 1997

[51] Int. Cl.⁶ .................................................. A21D 13/00
[52] U.S. Cl. ............................ 426/94; 426/275; 426/283; 426/496
[58] Field of Search ............................. 426/94, 275, 283, 426/496

[56] References Cited

U.S. PATENT DOCUMENTS

| | | | |
|---|---|---|---|
| D. 251,895 | 5/1979 | Belmuth et al. | D9/182 |
| D. 277,044 | 1/1985 | Kuhlman | D1/130 |
| D. 339,899 | 10/1993 | Kittleson | D1/122 |
| 628,449 | 7/1899 | Carr . | |
| 969,173 | 9/1910 | Loose . | |
| 1,174,826 | 3/1916 | Chapman . | |
| 1,179,294 | 4/1916 | Embrey . | |
| 1,646,921 | 11/1927 | Loose . | |
| 2,089,396 | 8/1937 | Meilstrup | 107/54 |
| 2,509,035 | 5/1950 | Corbett | 99/92 |
| 2,668,767 | 2/1954 | Lowe | 99/92 |
| 3,143,424 | 8/1964 | Wilson | 99/1 |
| 3,235,390 | 2/1966 | Vischer, Jr. | 99/194 |
| 3,677,769 | 7/1972 | King | 99/86 |
| 3,845,219 | 10/1974 | Federico | 426/19 |
| 3,880,069 | 4/1975 | Moline | 99/483 |
| 4,020,184 | 4/1977 | Chesner | 426/19 |
| 4,171,380 | 10/1979 | Forkner | 426/496 |
| 4,205,091 | 5/1980 | Van Horne | 426/138 |
| 4,283,424 | 8/1981 | Manoski et al. | 426/94 |
| 4,283,431 | 8/1981 | Giordano et al. | 426/296 |
| 4,308,286 | 12/1981 | Anstett et al. | 426/19 |
| 4,313,961 | 2/1982 | Tobia | 426/19 |
| 4,382,970 | 5/1983 | Sorensen | 426/275 |
| 4,416,910 | 11/1983 | Hayashi et al. | 426/502 |
| 4,463,020 | 7/1984 | Ottenberg | 426/19 |
| 4,543,053 | 9/1985 | Jasniewski | 426/502 |
| 4,551,337 | 11/1985 | Schmit et al. | 426/94 |
| 4,574,090 | 3/1986 | Paulucci | 426/439 |
| 4,626,188 | 12/1986 | Morganthaler et al. | 425/145 |
| 4,645,673 | 2/1987 | Wilmes | 426/94 |
| 4,661,361 | 4/1987 | Mongiello et al. | 426/283 |
| 4,696,823 | 9/1987 | DeChristopher | 426/496 |
| 4,753,813 | 6/1988 | Saadia | 426/283 |
| 4,842,882 | 6/1989 | Paulucci . | |
| 4,907,501 | 3/1990 | Rijkaart | 99/450.1 |
| 5,104,669 | 4/1992 | Wolke et al. | 426/94 |
| 5,180,603 | 1/1993 | Moriya et al. | 426/556 |
| 5,182,123 | 1/1993 | Edo et al. | 426/19 |
| 5,194,273 | 3/1993 | de Bruijne et al. | 426/94 |
| 5,196,223 | 3/1993 | Nakamura | 426/503 |
| 5,268,188 | 12/1993 | Diem et al. | 426/502 |
| 5,281,120 | 1/1994 | Morikawa et al. | 426/502 |
| 5,348,751 | 9/1994 | Packer et al. | 426/94 |
| 5,405,626 | 4/1995 | Van Der Graaf et al. | 426/94 |
| 5,417,150 | 5/1995 | Kordic | 99/432 |
| 5,417,996 | 5/1995 | Brink | 426/502 |
| 5,529,799 | 6/1996 | Bornhorst et al. | 426/549 |
| 5,560,946 | 10/1996 | Sanders et al. | 426/94 |

FOREIGN PATENT DOCUMENTS

| | | |
|---|---|---|
| 37 04 192 | 8/1988 | Germany . |
| 2 241 863 | 9/1991 | United Kingdom . |

*Primary Examiner*—Lien Tran
*Attorney, Agent, or Firm*—Brinks Hofer Gilson & Lione

[57] ABSTRACT

A folded pastry product and method for making the product are disclosed herein. The product incorporates a layered dough and fat pastry shape having a first end and a second end, a first flanged portion adjacent the first end and a second flanged portion adjacent the second end, each of the flanged portions including at least a pair of flanges and a narrowed area having side edges for holding the filling product. The flanges are overlapped to provide a recessed and sealed area for holding the filling product. The general shape of the pastry allows for efficient cutting from the pastry sheet and allowing for a minimum of wasted dough product. A method is also disclosed wherein a layered dough pastry shell is formed by cutting a shape from a sheet of layered dough, applying a filling to the shape, folding flanges of the dough shape in an overlapping fashion, indenting the flanges to clear a sealing area of filling before being sealed with a crimper. The filling may be baked along with the resulting pastry shell to provide a visible section of filling and to allow efficient baking thereof.

11 Claims, 10 Drawing Sheets

FOLDED PASTRY PRODUCT

BACKGROUND OF THE INVENTION

The present invention relates to baked products and methods for making such products. In particular, the invention relates to a folded pastry product and a method for making same.

Microwave ovens and conventional ovens have provided a convenient means for heating a variety of frozen food products. Within this category of frozen food products, frozen store-bought pizzas continue to be a popular microwave-heatable item for consumers. More recently, frozen pizza alternatives have been popular, such as pizza bread, frozen burritos and frozen strudels. These frozen products offer the convenience of being heatable in either a conventional oven or a microwave oven, while providing the convenience of individual serving sizes. Furthermore, the alternative shapes to the typically flat, round pizzas allow for a wider variety of toppings to accommodate for more consumer tastes.

Several pastry products and methods have been developed to provide these alternative products to the consumer. As mentioned above, among these products are pizza bread analogues in the form of an elongated bread product containing a tomato-based topping. In such a product, a yeast dough is partially baked and a topping is applied and cooked further along with the dough. In order to facilitate the addition of a topping, an incision may be made into the bread dough to provide a crevice for retaining additional pizza topping. An example of such a product is found in Chesner U.S. Pat. No. 4,020,184.

In another type of alternative product, a rolled pastry dough may be folded or rolled around a filling. Examples of such products are found in Wilson U.S. Pat. No. 3,143,424, Corbet U.S. Pat. No. 2,509,035, and Meilstrup U.S. Pat. No. 2,089,396.

While these products may be used to offer the consumer a wider variety of toppings and service sizes, they do not provide the user with a palatable and firm structure for handling the product while it is being consumed, especially when such a product is heated in a microwave oven. The exception is the pizza bread product, but the pizza bread is not always amenable to a wide variety of toppings, and microwave cooking tends to make the bread soggy.

In general, frozen food items of the thin-crusted variety tend to more generally favored if the crust has a crispy quality when cooked. These characteristics are easily accomplished in a conventional oven due to such an oven's direct surface heating and drying effects. In microwave ovens, however, excess moisture within the frozen crust often causes it to become soft and soggy. Excess liquid within the filling also causes this problem. After prolonged exposure, the crust becomes tough and unpalatable, with the crumb of the crust becoming rubbery and gummy. Reducing the amount of time the crust is exposed to microwave energy is usually not a possibility, because the toppings or filings must be heated to a proper serving temperature. By the time the toppings are adequately heated, the crust can already be unpalatable.

Various attempts have been made to overcome the problems associated with exposure of filled crusts to microwave energy. These improvements, however, have been only minimally successful. For example, dough formulas have been manipulated to make them homogeneously higher in shortening content and eggs. The inclusion of these additional ingredients slows the crust's absorption of microwave energy. These types of crusts do not have a pleasant taste or texture, nor are they amenable to use in products other than flat, topped frozen pizzas.

Other cures such as pre-cooking or pre-toasting have been attempted to reduce the amount of moisture in the bread product and thus alleviate the problems caused when the product is exposed to microwave energy. However, the pre-cooking can degrade the taste and instead create a dry, unappealing product. In the case of pizzas, the reduction of moisture in the pre-cooked crust becomes somewhat futile, because the low moisture is counteracted by the addition of the pizza toppings, such as tomato sauce, cheese, meats, and vegetables, all of which re-contribute moisture to the crust. This moisture problem would be especially significant if the crust was wrapped around a filling rather than being used as a base beneath it. Moreover, the pre-toasting adds an additional, expensive step to the entire manufacturing process.

Other methods for incorporating fat into crusts or pastry have been developed to improve the overall texture of the crust. One method includes incorporating flakes of shortening or fat into a homogenous dough. This crust is not specifically formulated for improved microwavability, however, and such a crust does not adequately possess the desirable texture of traditionally cooked thin-crusted pizzas or other pastry products.

Furthermore, some dough products for commercial foods such as pies and pastries are made using a laminated dough. A laminated dough typically comprises thin layers of dough separated by either a layer of fat or a layer of dough of a differing type. These laminated doughs have previously been used for puffed, highly risen pastries, which have little value if the consumer desires or a particular filling requires thin, rigid crusts or pastries. Crusts and pastries have also been made from a pressed laminated dough, although the advantages of using a multiple-layer dough tend to be lost during the steps of pressing or stamping the dough into discs. The pressing or stamping homogenizes much of the layered structure.

SUMMARY OF THE INVENTION

It is therefore an object of the present invention to provide an improved pastry product that exhibits eye-pleasing qualities by allowing a portion of filling to be visible to the consumer.

It is another object of the present invention to provide a folded pastry product and method of making the product that allows simplified folding and filling of a pastry.

It is still another object of the present invention to provide a method of sealing a filled pastry product to create a secure seal to hold a filling within the pastry.

It is still another object of the present invention to provide a pastry shape that securely holds its shape throughout the manufacturing process and through the reheating and use by the consumer.

It is also an object of the present invention to provide a folded pastry product which allows a filling to be efficiently heated along with the pastry.

It is yet another object of the present invention to provide a folded pastry product which incorporates a substantial quantity of laminated crust in a compact form to provide for efficient packaging and consumption.

In one aspect of the present invention, a folded pastry product is provided including a layered dough pastry shape having uniform, alternating layers of a fat and a dough. The shape is defined by a first end and a second end, a first flanged portion adjacent the first end and a second flanged portion adjacent the second end. Each of the flanged portions includes a pair of flanges, and a narrowed area is defined between the end first and the second flanged portions. Each flange pair is folded over itself on each end, and the side edges of the narrowed area are slightly upturned. This provides an area at the center of the shape for holding a filling product, such as a pizza sauce, meat, or cheese. The ends of the shape are crimped to form a seal to hold the filling and secure the shape in the folded configuration. The laminated dough remains crispy upon baking, and the filling is efficiently maintained within the folded crust shape. Upon reheating by the consumer in either a microwave or a conventional oven, the folded product exhibits an improved texture, flakiness, and structure to allow for efficient consumption. The flaky crust, assisted by the upturned side edges, allows the user to consume the product with a minimum of holding pressure by the hands, and a minimum of mess.

In another aspect of the present invention, a method is provided for making a folded pastry product including the steps of providing a layered dough pastry sheet incorporating alternating layers of a fat and a dough, cutting a continuous row or strip of connected shapes from the sheet, each of the shapes including a first end and a second end, a first flanged portion adjacent the first end and a second flanged portion adjacent the second end. A narrowed area is defined between the first and second flanged portions on each shape, while each flanged portion defines at least a pair of flanges on each end of each shape. Next, a filling is applied to the row of shapes through the narrowed areas, and the flanges are folded over each other in an overlapping fashion to provide a recessed area for holding the filling on each shape. The filling is then pushed away from the ends and the ends are crimped and cut to separate the shapes in each row. The folded shapes are finally baked, preferably in a gas-fired impingement oven.

These and other features and advantages of the invention will become apparent upon review of the following detailed description of the presently preferred embodiments of the invention, taken in conjunction with the appended figures.

DESCRIPTION OF THE DRAWINGS

The invention will be explained with reference to the drawings, in which.

DETAILED DESCRIPTION OF THE INVENTION AND THE PRESENTLY PREFERRED EMBODIMENTS

A description of the laminated dough used in the preferred embodiment of the invention will be presented first, followed by a description of the shaping, cutting and assembly steps of the embodiment.

Figure 1:
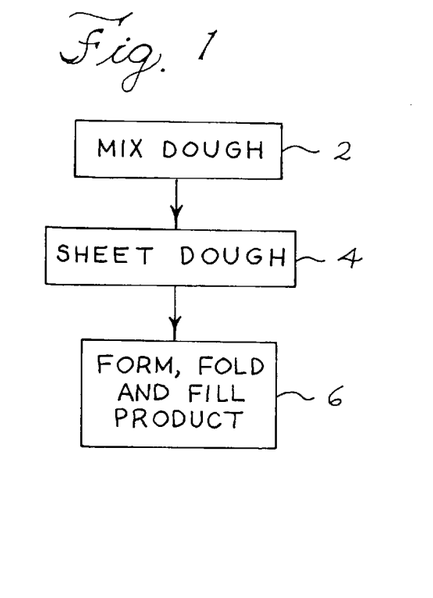
FIG. 1 shows a high-level flow chart of the process for making a laminated dough and crust used in the preferred embodiments of the present invention.

In accordance with the preferred embodiment of the present invention, the method for making the laminated dough used in the present embodiment of the pastry product is shown generally in FIG. 1. As shown in the figure, a dough is first mixed (2), then sheeted to form a workable pastry dough (4), and finally formed, filled and folded (6) to form the final dough product.

Figure 2:
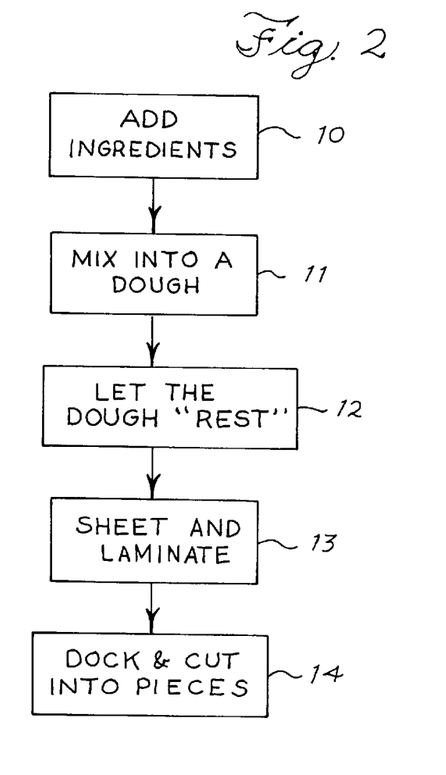
FIG. 2 shows a high-level flow chart of the process for producing the dough mixture used in the present invention.

Specifically, as shown in FIG. 2, after ingredients for the dough are mixed (10–11), the dough is allowed to rest a period of time (12). After this resting period, a sheeting and laminating process (13) is performed on the rested dough to produce a layered sheet of dough and fat. When the laminated dough is of the proper thickness and comprises the desired number of layers, the dough is "docked" or punctured with holes to prevent ballooning of the dough.

The following example shows the ingredients used in the manufacture of a dough in accordance with the present invention. The crust mixture which is used in the preparation of the laminated crust includes approximately 60% by weight of a flour having a protein content of approximately 12%. 1.83% by weight of active dry yeast is also added, along with 1.22% salt, 1.22% sugar, and 32% water at a temperature between 50 and 60 degrees F. (all percentages are by weight of total dough). A dough conditioner is added in a quantity of about 3% by weight. The conventional dough conditioner, preferably of the type manufactured by Microgold, stabilizes the mixture. A table summary of these ingredients in an example batch (quantitized by weight of ingredients) is listed below.

| Ingredient | Pounds |
| --- | --- |
| Flour - 11% Protein | 100 |
| Yeast - Dry Instant Active | 3 |
| Salt | 2 |
| Sugar | 2 |
| Margarine - Uncolored, Solid | 2 |
| Water | 52 |
| Microgold Dough Conditioner | 5 |
| Hi-melt Margarine Roll-In % | 10% |

Figure 3:
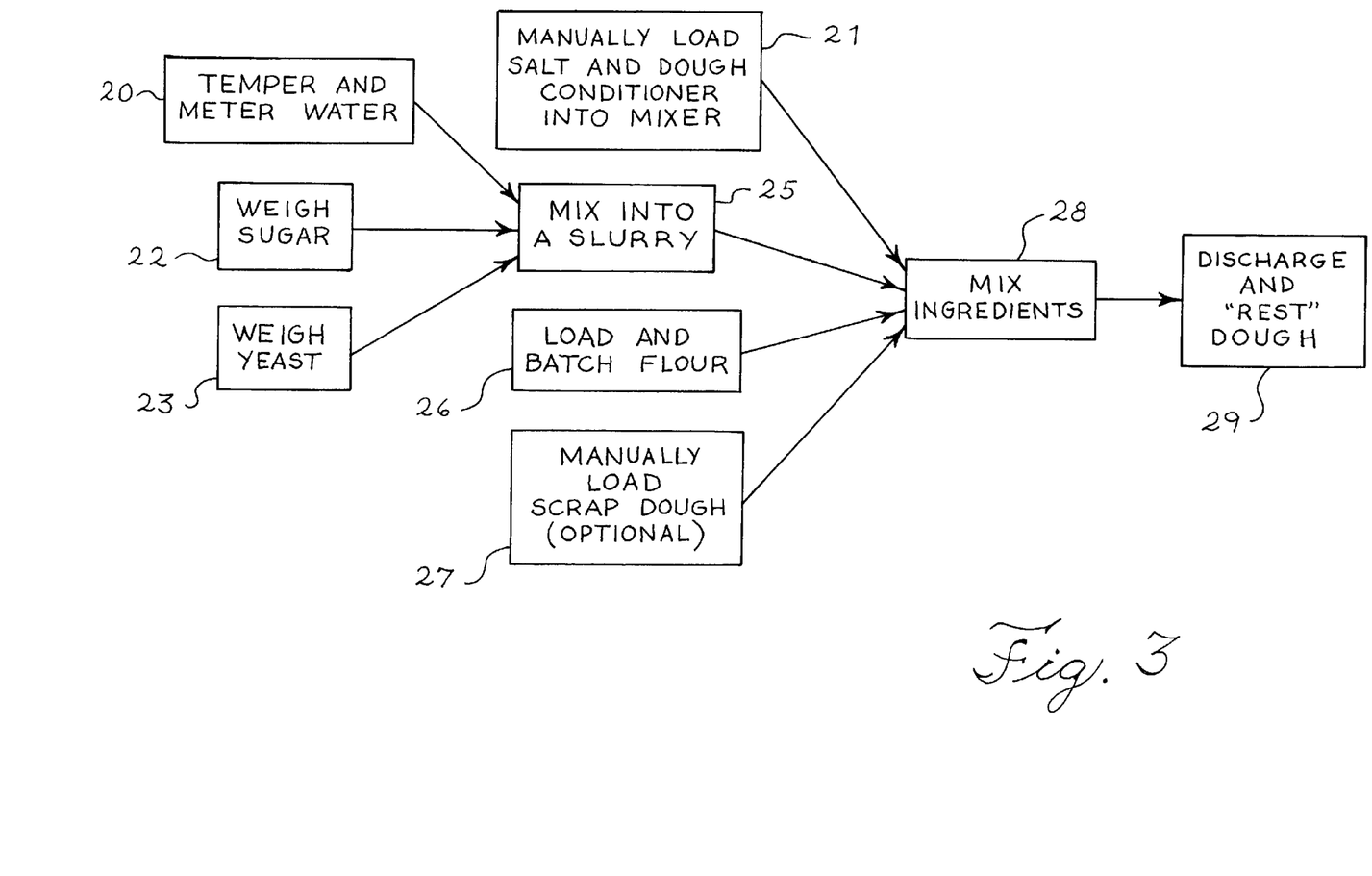
FIG. 3 shows a more detailed flow chart of the dough-mixing process used in the present invention.

As shown in the flow diagram of FIG. 3, selected ingredients are first weighed (boxes 20, 22 and 23 in the flow diagram), and the water, sugar, and yeast are mixed into a slurry (25). The water used at box 20 is filtered water brought to the specified temperature. The slurry solution is then mixed and pumped to a use tank. The measured flour, slurry, salt and dough conditioner are then loaded (21, 25–26) and mixed together (28). Scrap dough may be added as well (27). The mixing occurs at high speed for 2 to 3 minutes until a preferred target temperature of approximately 80–89 degrees F. is reached. After mixing, the dough is discharged onto an incline conveyor belt and conveyed slowly for 45 minutes to 1 hour (29 in FIG. 3, 12 in FIG. 2). This "resting" or "proofing" stage allows the yeast in the dough to activate and cause the dough to rise.

As shown in FIG. 2, following the resting period 29 the sheeting and laminating process 13 is performed on the dough. This process is illustrated by the flow diagram of FIG. 4. As shown in this figure, various cutting, rolling, piling and stretching operations are performed on the dough.

Figure 4:
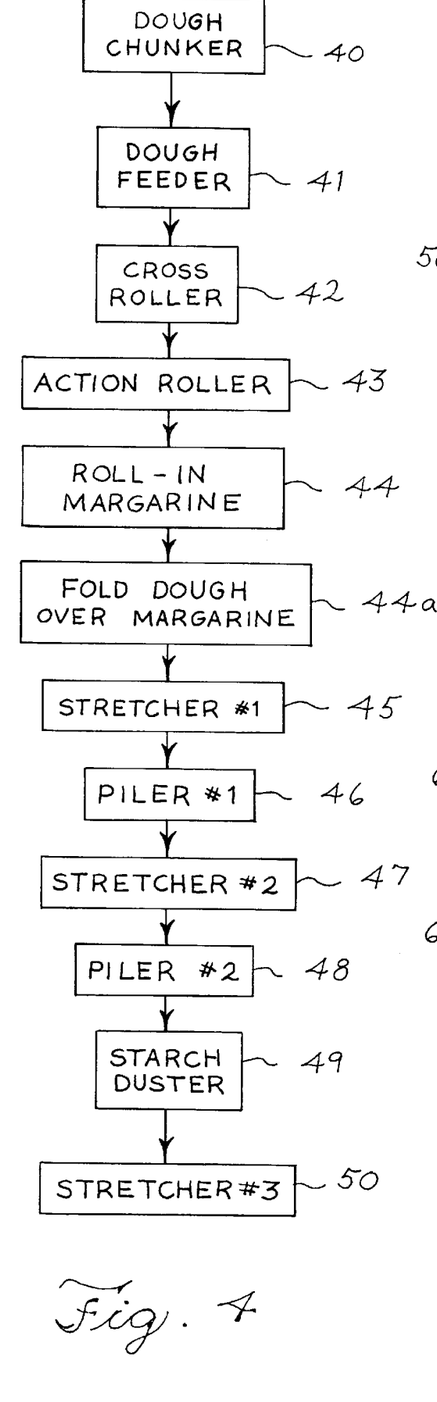
FIG. 4 shows a flow chart of the process for sheeting and laminating the dough used in the present invention.

In particular, at box 40 in the flow diagram, a dough chunker divides the dough into approximately 60-pound chunks in order to properly load a dough feeder. At 41, the dough feeder receives the chunks of dough dumped into a hopper. The conventional feeder uses a belt and cutting blade to deposit overlapping dough strips on a moving conveyor. The line of strips measures 35–50 mm thick and 480–570 mm wide. A roller is next run across the overlapped dough to spread and even the distribution of the dough (42). The dough is then run through three sets of rollers to gently work it into a thin sheet 6.5–8 mm thick (43).

High-melt margarine at a temperature between 65 and 71 degrees F. is extruded through a rectangular nozzle into a strip on the middle third section of the dough sheet (44). The quantity of margarine added by weight is equal to 15% of the total weight of the dough. The outer portions of the dough are then folded in overlapping thirds, thus sandwiching the margarine in the middle of the dough and forming a fatted dough (44a).

The fatted dough is then stretched by a first stretcher at 45. in this operation, a series of rollers are rotated in a circular fashion. The dough passes underneath these rollers on three different conveyors at a speed determined by a speed ratio setting. This setting in combination with the clearance between the rollers and the belt determines the final thickness of the dough after the rolling.

As shown in box 46, the fatted dough is "piled" by a first piler to create a first series of layers. Preferably, the piler travels back and forth distributing the dough onto a conveyor belt situated at a 90 degree angle from the direction of feed. The conveyor is thus loaded with a sheet of dough having overlapping folds. The number of folds across the width of the dough sheet is multiplied by two to determine the number of layers presently in the dough. The dough is then stretched by a second stretcher at 47 into a fatted sheet, and piled by a second piler at 48 to create a layered sheet having a thickness between 15 and 20 mm. At this point, the dough sheet has its final sixteen-layer structure. To facilitate the handling and manipulating of the sheet in further process steps, a dusting of starch is made to the underside of the sheet at 49. Finally, at 50, a third stretcher rolls the dough to a final thickness of 3–5 mm.

In order to determine the total number of layers the dough will eventually have, the number of layers present after the first piler is multiplied by the number of layers present after the second piler. For example, if 4 layers are run after the first piler and 4 layers are run after the second piler, the dough sheet will have a total of 16 layers.

Figure 5:
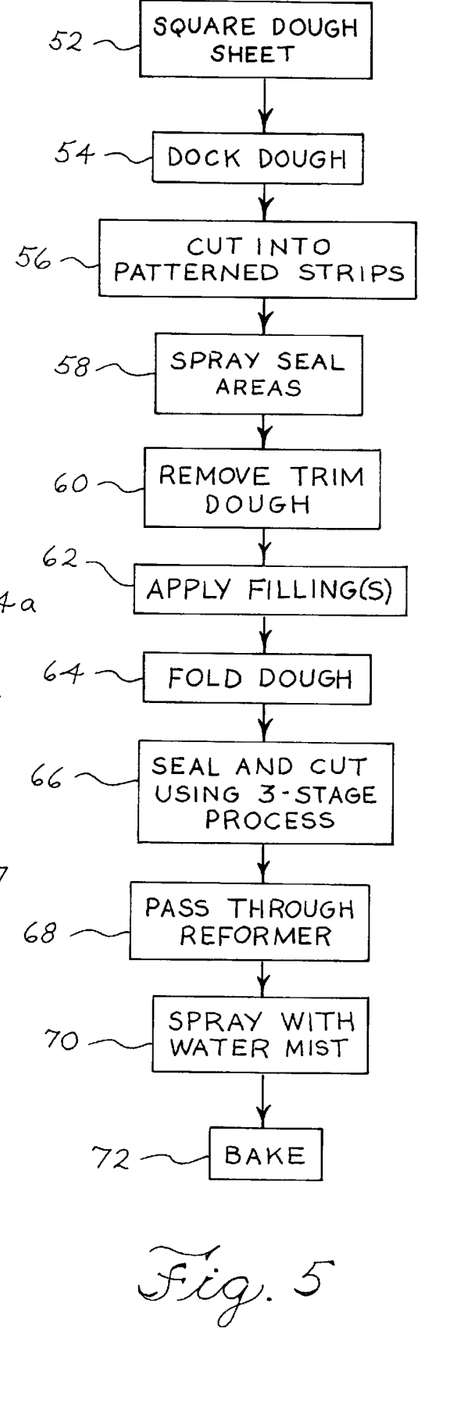
FIG. 5 shows a flow chart of the process for filling and folding the pastry product shapes of the present invention.

After the final thickness is achieved, the dough sheet is forwarded to a folding and filling process of the present invention as shown in the flow diagram of FIG. 5. The dough sheet is first cut to a uniform width at 52. Preferably, before or after cutting, the dough is "docked" or punctured at 54 to prevent the dough from expanding or "ballooning" in the oven. The puncturing is performed by a roller with a large number of projecting pins to punch a pattern of holes through the dough. The dough sheet is now ready for folding and forming.

The processing machinery preferably used in the described process is as follows. The high-speed dough mixer is a Model TK160, preferably manufactured by Stephan. The sheeting and laminating system preferably comprises components manufactured by Rheon, and include the following components and model numbers: Surface Cleaner Model SV013, Sheet Folder Model FF111, Stress Free Stretcher Model SM231, Flour Duster Model DF103, Dough Feeder Model EX050, Underneath Conveyor Model PC502, CWC Cross Action Roller Model M103, Fat Pump Model XC230, Roll-In Conveyor Model WC303, Sheet Folder Model FF101, Stress-Free Stretcher Model SM501, Pile-Up Table Model PC011, Parallel Piler Model LM608, Pile-Up Table Model PC103, Cross Roller Model CM523, Flour Sweeper Model FV376, Stress-Free Stretcher Model SM318, Circular Cutter Model OK833, Spacing Conveyor Model 2C672, Press Roller Model MR308, Single Rotary Cutter Frame Model RK013, Synchronized Conveyor Model MC013, and Guillotine Cutter Model GK013. The various ranges settings for these devices are shown in the table below.

PREFERRED RANGES AND SETTINGS FOR EQUIPMENT

|  | Low | High |
|---|---|---|
| Mixer | | |
| Mix Time (seconds) | 100 | 180 |
| Dough Chunker | | |
| Intervals per minute | 2 | 5 |
| Dough Feeder | | |
| Flour Setting #1 (Beginning of Line) | 10 | 30 |
| Dough Intervals | 230 | 280 |
| Flour Setting #2 (Before Cross Roller) | 10 | 30 |
| Cross Roller Gage (mm) | 15 | 40 |
| Action Roller | | |
| Flour Setting #3A (Top of Action Roller) | 0.5 | 1.5 |
| Flour Setting #3B (Bottom of Action Roller) | 10 | 30 |
| Roller Gage (mm) | 4 | 7 |
| Set Dough Width (mm) | 650 | 725 |
| Output Belt Speed (m/min) | 1.00 | 2.75 |
| Stretch Ratio | 2 | 4 |
| Roll-In | | |
| Belt Speed (m/min) | 1.0 | 2.8 |
| Screw Speed (rpm) | 0.2 | 1.15 |
| Stretcher #1 | | |
| Flour Setting #4A (Top of Stretcher #1) | 20 | 35 |
| Flour Setting #4B (Bottom of Stretcher #1) | 10 | 30 |
| No. 1 Belt Speed/Incline Angle | 1.0/15 deg. | 2.75/40 deg. |
| Speed Ratio | 2.5 | 4.5 |
| Roller Clearance (mm) | 0.8 | 2.0 |
| Number of layers after Piler #1 | 2 | 6 |
| Folding Width (mm) | 25/25 | 40/40 |
| Piler Belt Speed | 300 | 700 |
| Flour Setting #5 (After Piler #1) | 10 | 20 |
| Stretcher #2 | | |
| Flour Setting #6A (Top of Stretcher #1) | 10 | 40 |

-continued

| | Low | High |
|---|---|---|
| Flour Setting #6B (Bottom of Stretcher #1) | 15 | 35 |
| Gage (mm) | 0.8 | 3 |
| Speed Ratio | 2.0 | 6.0 |
| Input Thickness (mm) | 15 | 25 |
| Belt #1 Speed (m/min) | 1 | 3 |
| Number of layers after Piler #2 | 2 | 6 |
| Folding Width (mm) | 650 | 700 |
| Piler Belt Speed | 4 | 14 |
| Flour Setting #7 | 1 | 3 |
| Flour Setting #8 (After Piler #2) | 0.8 | 2 |
| Stretcher #3 | | |
| Flour Setting #9A (Top of Stretcher #3) | 1 | 2.5 |
| Flour Setting #9B (Bottom of Stretcher #3) | 10 | 50 |
| Belt #1 Speed (m/min) | 0.5 | 2.5 |
| Speed Ratio | 2 | 5 |
| Crank Clearance (mm) | .05 | 5 |
| Gas Impingement Oven | | |
| Bake Time (minutes) | 4 | 6 |
| Oven #1 Temp (deg. F.) | 375 | 525 |
| Oven #1 Fan (% of maximum) | 10 | 50 |
| Oven #1 Height (inches) | 1.5 | 3.5 |
| Oven #2 Temp (deg. F.) | 350 | 500 |
| Oven #2 Fan (% of maximum) | 10 | 50 |
| Oven #2 Height (inches) | 1.5 | 4.5 |
| Baffles (Top/Bottom) | 0/100 | 80/20 |

The preferred parameters for various dough dimensions and temperatures are summarized below. These ranges are useful when the process of the present invention is performed on alternative equipment. The present invention is not limited to these parameters, although those listed have been found to be optimal for the equipment used.

PREFERRED MEASUREMENT PARAMETERS

| | Low | High |
|---|---|---|
| Room Temperature (deg. F.) | 60 | 70 |
| Yeast Solution Temperature (deg. F.) | 50 | 65 |
| Dough Temperature after mix (deg. F.) | 80 F. | 89 F. |
| Dough Width after feeder (W1 - mm) | 480 | 570 |
| Dough Thickness (T1 - mm) | 35 | 50 |
| Dough Temperature (deg. F.) | 75 F. | 85 F. |
| Dough Width before butter roll-in (W2 - mm) | 650 | 800 |
| Dough Thickness before butter roll-in (T2 - mm) | 5 | 8 |
| Roll-In Temperature (deg F.) | 55 F. | 80 F. |
| Dough Width after butter roll-in (W3 - mm) | 280 | 320 |
| Dough Thickness after butter roll-in (T3 - mm) | 20 | 30 |
| Dough Width after stretcher #1 (W4 - mm) | 300 | 400 |
| Dough Width after 1st Piler (W5 - mm) | 300 | 350 |
| Dough Thickness after 1st Piler (T5 - mm) | 12 | 25 |
| Dough Width after stretcher #2 (W6 - mm) | 250 | 350 |
| Dough Width after 2nd Piler (W7 - mm) | 600 | 700 |
| Dough Thickness after 2nd Piler (T7 - mm) | 15 | 20 |
| Dough Width after stretcher #3 (W8 - mm) | 600 | 700 |
| Final Dough Thickness (T8 - mm) | 2.5 | 5 |

The various stretching and rolling procedures using the above preferred parameters result in a unique 16-layer laminated dough with excellent taste and texture. The resulting pastry is crispy and is able to withstand topping, freezing, and microwaving without any significant degradation in these qualities.

Figure 6:
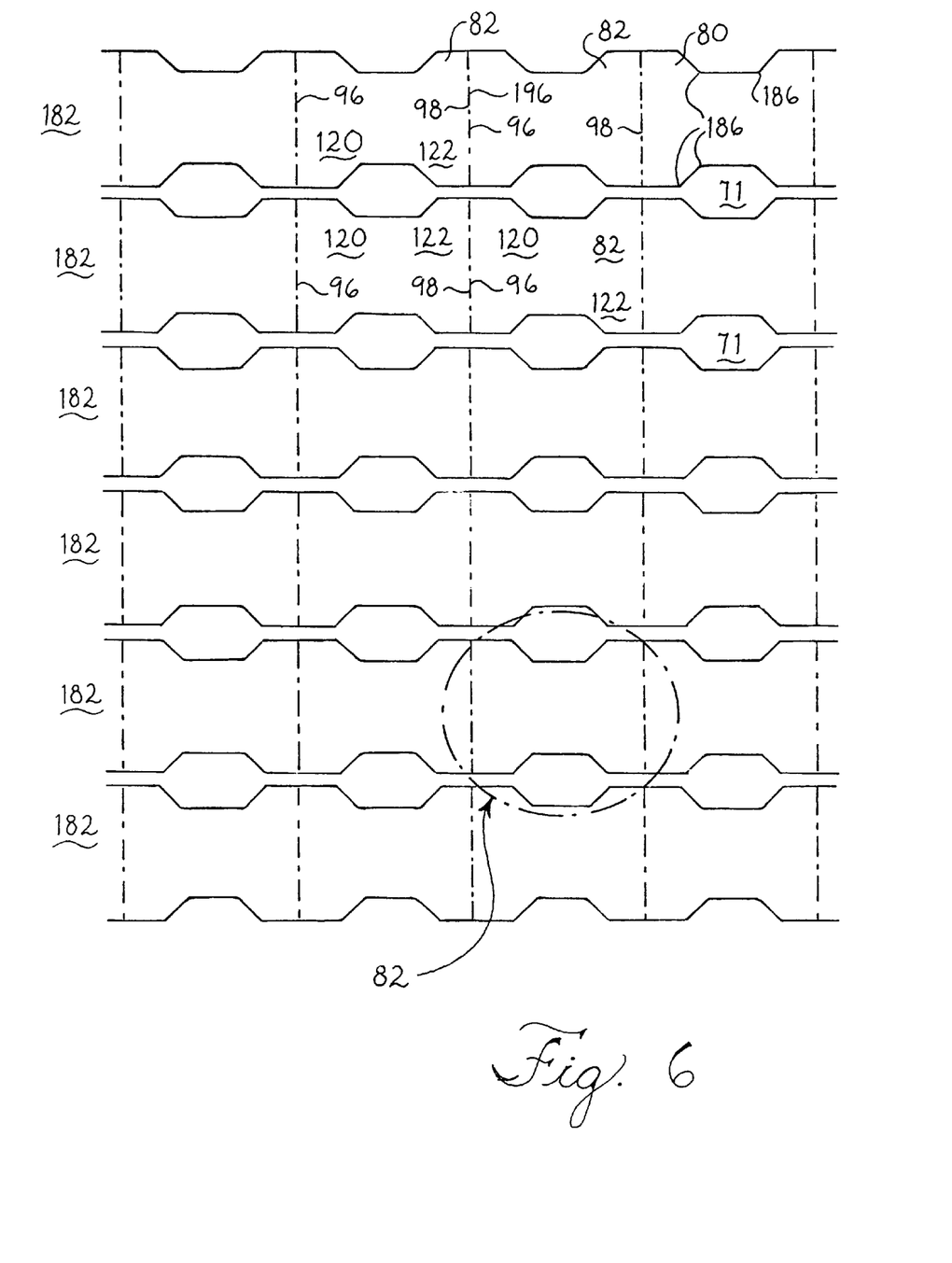
FIG. 6 is a top view showing a detailed step of the process shown in FIG. 5.

Continuing with reference to FIG. 5, the laminated dough that results from the various rolling, stretching and piling operations is next cut and folded into shapes which will be used in the preferred embodiment of the present invention. The cutting operation of step 56 is illustrated in detail in FIGS. 6 and 7. As shown in FIG. 6, the rolled laminated dough sheet is placed on a conveyor (not shown) where a conventional cutting apparatus scores a series of patterned strips 182 each consisting of interconnected, curved-edged shapes 82 as shown in FIG. 6. The conventional cutting blades are run via either a cutting wheel, cutting drum or even a laser to provide cut lines 86 to score the strips 182 containing the plurality of shapes 82 from the sheet 80.

Figure 7:
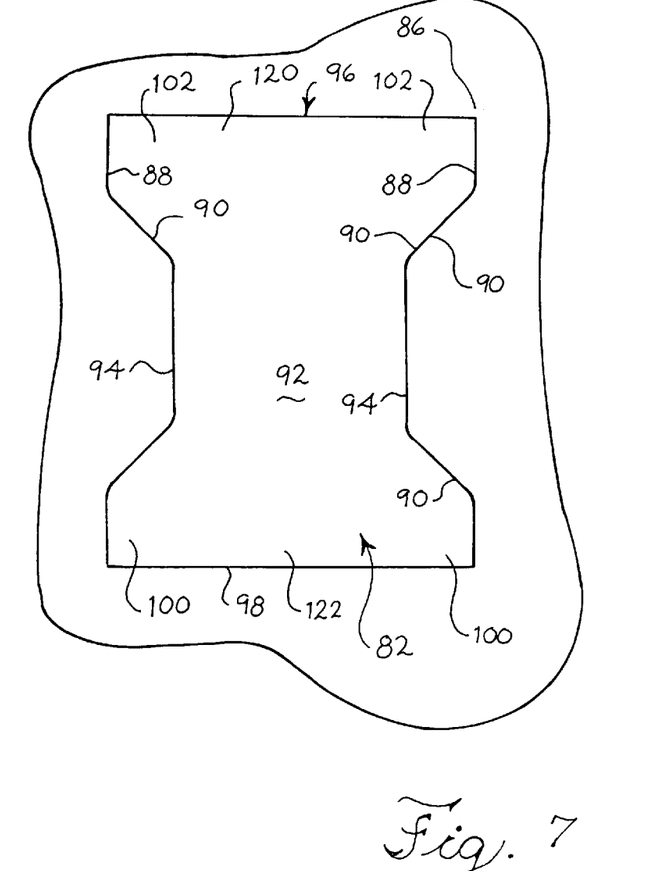
FIG. 7 shows one embodiment of the pastry product shape which is incorporated into the present invention.

Preferably, as shown in detail FIG. 7, the outline of each of the shapes 82 incorporates edges and flanges to allow a plurality of shapes 82 to be efficiently cut from the laminated dough sheet 80 with a minimum of waste or scrap dough 71. In particular, as shown in FIG. 7, each of the shapes 82 includes a first end 96 and a second end 98 longitudinally separated by a narrowed area 92 near the center of the shape 82. The narrowed area 92 is bound by a pair of side edges 94. Preferably, at each of the first end 96 and second end 98, a flanged portion 120 and 122, respectively, are located. Each flanged portion 120 or 122 includes a pair of flanges 102 or 100, respectively. Each of the flanges 100, 102 preferably incorporates curved edges to facilitate folding of the shape 82 and the minimization of waste.

Referring in particular to flanged portion 120 at the first end 96 of the shape 82, each flange 102 includes an edge 88 which is preferably generally perpendicular to the edge of first end 96. The straight edge 88 progresses curvilinearly to a tapered edge 90 to interface with the side edge 94 in the narrowed area 92. The mirror image of flange 102 and the opposing set of flanges 100 lie at the second end 98. Preferably, the length of ends 96 and 98 are preferably of substantially the same length. The curvilinear progressions along the cut lines 86 are preferably traced to have an approximate radius of 4 inches. Also, the overall preferred length of a single shape 82 within the strip 182 is approximately 5.7 inches from a first end 96 to a second end 98. The narrowed area 92 is preferably approximately 2.16 inches long and centered between the first end 96 and the second end 98 on each of the shapes 82.

As described above and as shown in FIG. 6, the shapes 82 are lined up edge-to-edge while on the conveyor to make up each strip 182. In particular, the second end 98 of one shape will interface with the first end 96 of an adjoining shape 82 via a juncture line 196. Note that, preferably, the ends 98 and 96 forming juncture 196 are not yet cut within the strip 182. These edges are described heretofore only for the purposes of describing the boundaries of the shapes 82 that will be produced. The junctures 196 and edges 98 and 96 will be formed as described below further in the process. In effect, the cutter wheel at step 56 in FIG. 5 cuts preferably only the edges 86 to form the strips 182.

The strips 182 are aligned so that the flanged portions 120 and 122 on a particular strip 182 are aligned with those of an adjacent strip 182 along the conveyor. Preferably, six strips are aligned in this fashion and in parallel along the conveyor belt to facilitate production.

Figure 8:
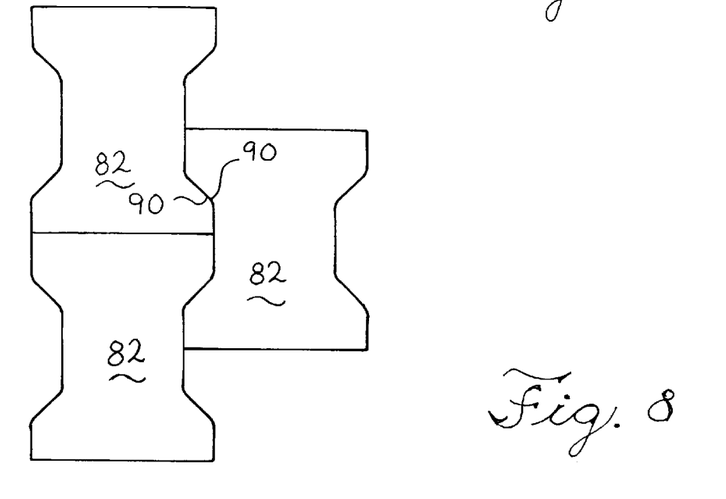
FIG. 8 shows the embodiment of the pastry product shape shown in FIG. 7 arranged in an alternative configuration from that of FIG. 6.

In an alternative alignment arrangement as shown in FIG. 8, the length of side edge 4 allows for the incorporation of a pair of edges 88 from a pair of neighboring shapes 82, and the tapered edges 90 are sized to interface with each other. The flanges of neighboring shapes 82 within a single sheet of laminated dough 80 are thus able to interface with each other to minimize any scrap dough product if the adjacent strips 182 are offset slightly, by ½ the length of each shape 82.

Figure 9:
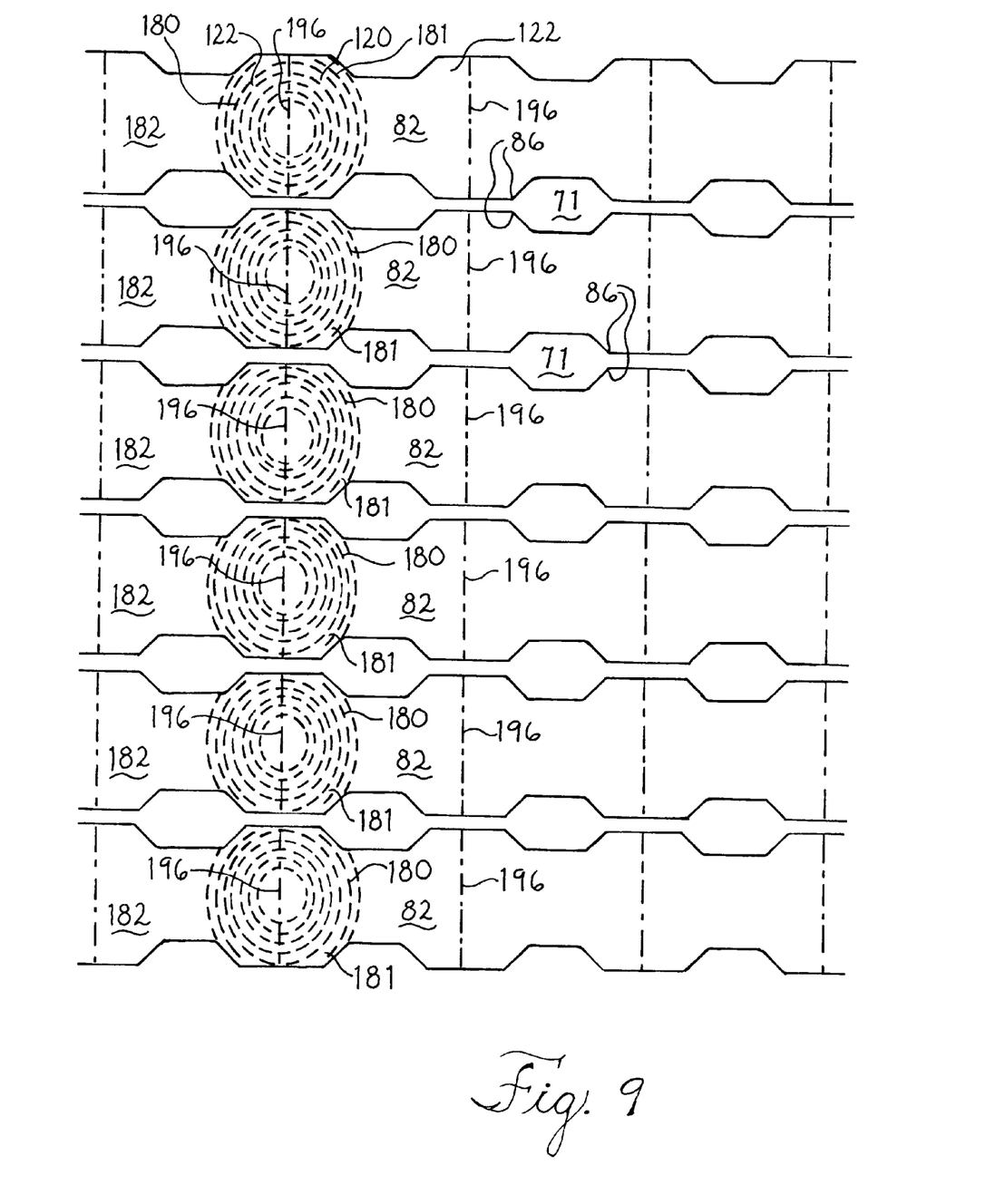
FIG. 9 shows another step of the process of the present invention.

After the strips 182 are cut from the sheet 80, seal areas are sprayed and the trip dough is removed as shown in steps 58 and 60 of FIG. 5. As shown in detail in FIG. 9, these steps are performed to prepare the dough strips 182 for introduction of a filling.

The areas on each strip 182 which contain both flanged portions 122 and 120 for individual pieces 82, which are generally the same areas as those surrounding each juncture 196, comprise a plurality of sealing areas 181 on each strip 182. in order to facilitate the dough's ability to seal to itself and retain its placement, the sealing areas 181 are each sprayed with a fine mist of water as the conveyor moves the strips 182 through the processing machinery. At the same time, the scrap dough 71 which lies between the cut edges 86 forming each strip 182 is removed and recycled in the mixer at step 27 of FIG. 3.

Figures 10, 12A:
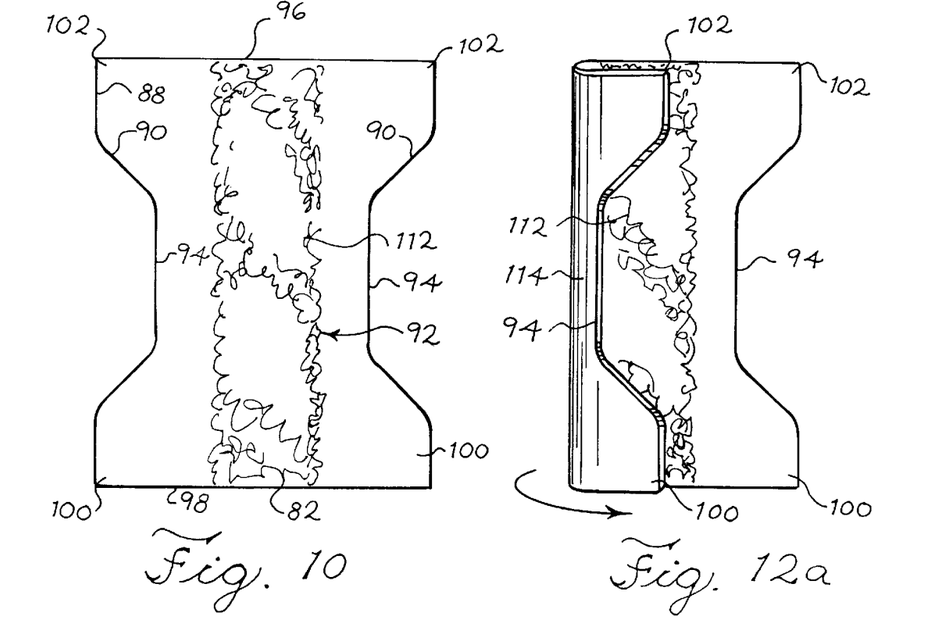
FIG. 10 shows the pastry product shape of FIG. 7 incorporating a filling deposited onto the shape.
FIGS. 12a–12b illustrate the particular folding steps of the product shape shown in FIGS. 7, 10 and 11 used in the process of the present invention.
Figure 11:
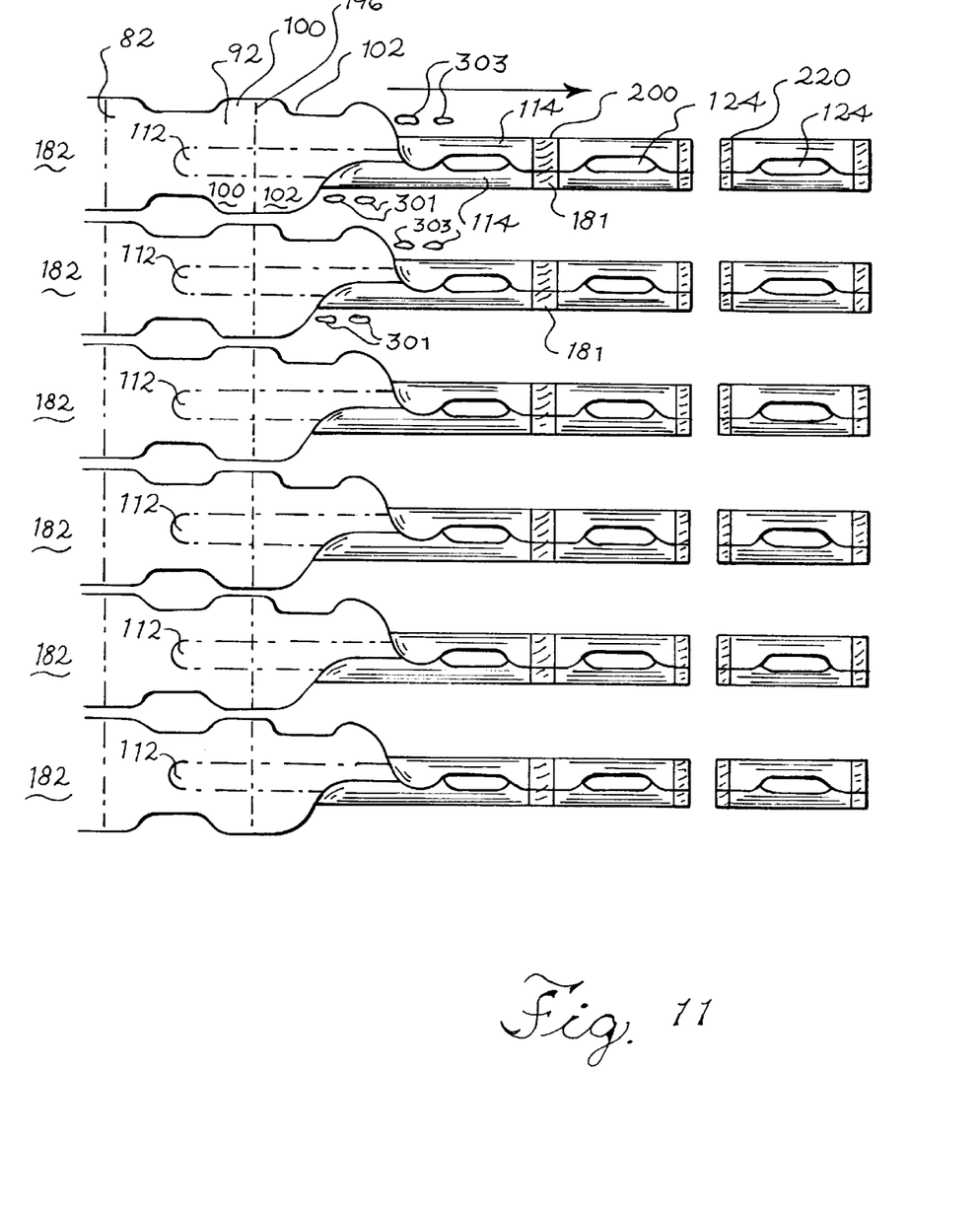
FIG. 11 shows a series of steps in the folding and sealing process of the present invention.

Next, at step 62 of FIG. 5, a filling 112 is applied as shown in FIGS. 10 and 11. The filling 112 is preferably extruded on the dough sheet through the narrowed area 92 of each shape 82 in a continuous ribbon of elliptical cross-section. in the alternative, the filling need not be applied at this time, but rather after the dough shape 82 is folded, or even folded and baked.

Figure 12B:
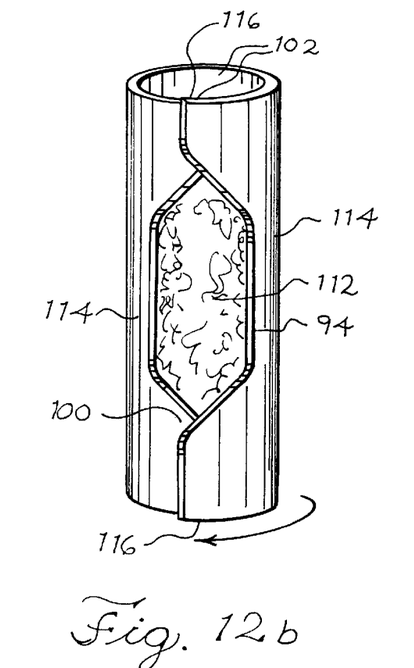

Each shape 82 is next folded in step 64 of FIG. 5 as shown in FIG. 11 and by illustration in FIGS. 12*a* and 12*b*. As shown first in FIG. 11, the dough strips 182 are each moved between two pairs of forming plows 301 and 303 which surround each strip and cause the flanged portions 120 and 122 consisting of flanges of 100 and 102 on each shape 82 to be folded over the strip of filling 112 in an overlapping fashion as shown.

Referring now to FIG. 12*a* for illustrative detail of each shape 82, flanges 102 and 100 are folded over the first end and second end portion of the shape 82, respectively. Upon folding of the flanges 102 and 100, a small portion of the side edge 94 is also folded over by the plows to create an upturned edge wall 114. The edge wall 114 assists in retaining the filling within the center area of the narrowed area 92. As shown in FIG. 12*b*, right-side flanges 102 and 100 are also preferably folded over the left-side flanges 102 and 104. As with the left-side flanges, a small portion of the side edge 94 is also upturned to create a right edge wall 114 to assist in retaining the filling 112. The folding of the flanges 102 and 100 is accomplished via conventional automatic pastry folding machinery, such as that manufactured by Rheon.

Figures 13A, 13B, 13C, 13D:
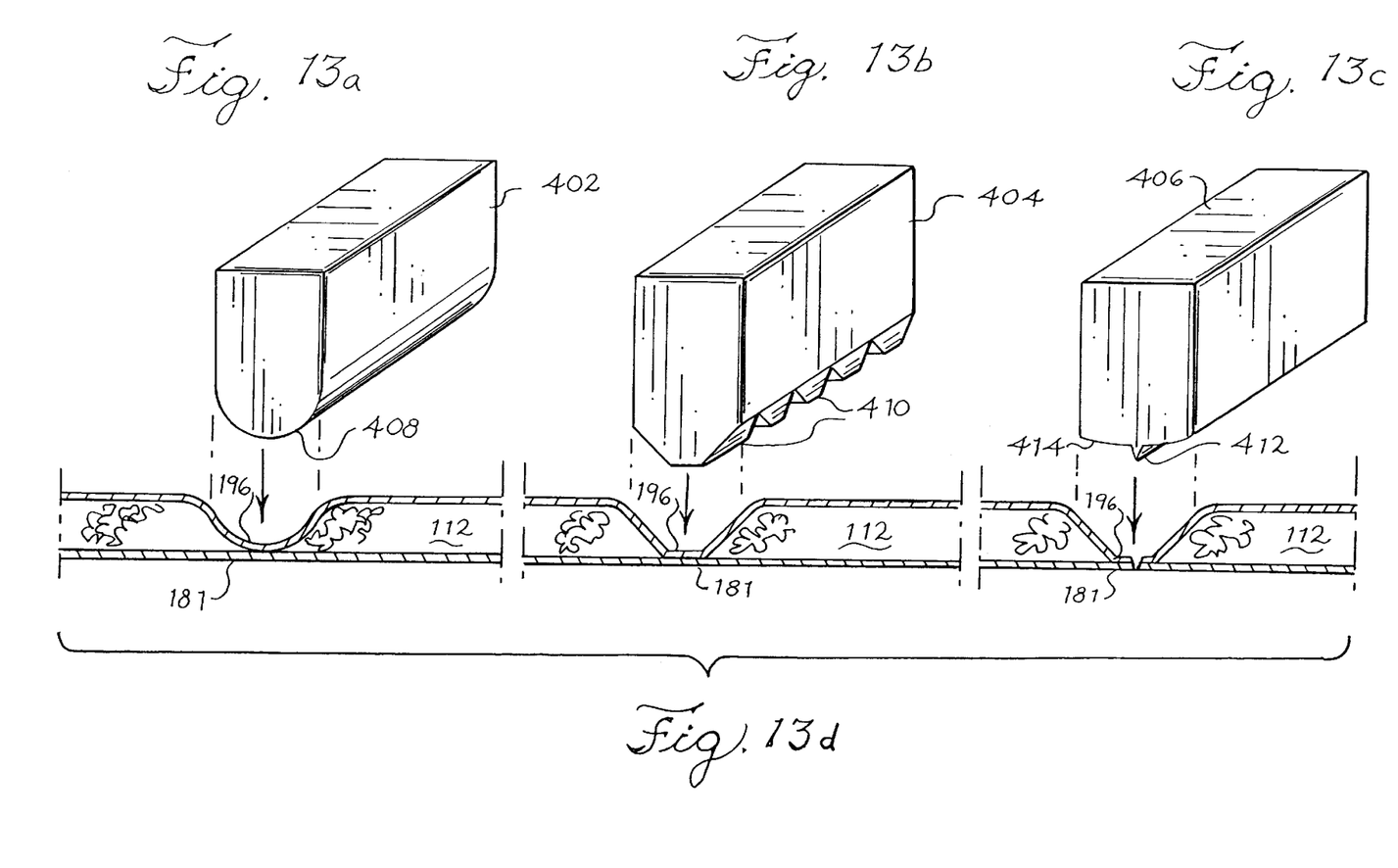
FIGS. 13a–13c show a perspective and a side view of the tools used in the process of the present invention.
FIG. 13d shows view of the pastry product shapes which are incorporated into the present invention.

Next, the dough strips are sealed and cut in a three-stage process at step 66 of FIG. 5. The sealing and cutting process is shown in detail in FIGS. 11 and 13*a*–13*e*. As shown in the middle portion of FIG. 10, the folded strips 182 are forwarded to a rotary sealer and cutter to separate the individual folded shapes 82 from the strips 182. The rotary sealer and cutter is shown in FIGS. 13*a*–13*d*. The rotary sealer and cutter consists of a rotary drum (not shown) on which is mounted three dies or tools to accomplish the three-stage sealing and cutting process. As shown in FIG. 13*a*, stage one of the process is accomplished by die 402 which initially contacts the moving dough strips 182 to indent the filled and folded dough at the overlapped sealing area 181. The die 402 incorporates a curved contact area 408 at its outer edge, and the edge 408 forces the filling away from the sealing area 181 within each folded strip 182. This is shown in the cross-sectional views of FIGS. 13*d*–*e* as indented portion 281. By forcing the filling away from the sealing areas 181, the folded and base portions of the dough strips 182 are allowed to contact each other directly without any interference from a filling to interrupt the effectiveness of the seal.

Figure 13E:
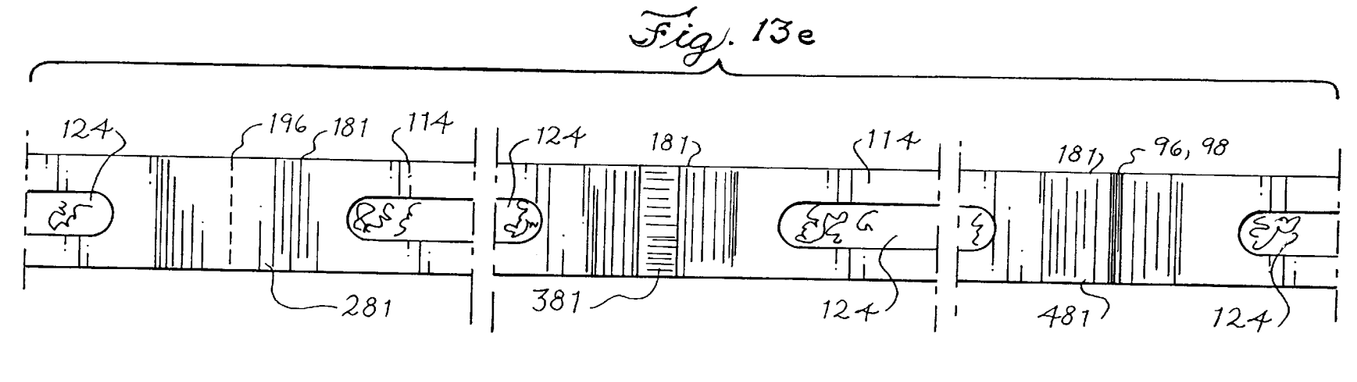
FIG. 13e shows a top view of the pastry product shapes.

At the next stage of the process, a second die 404 mounted on the drum contacts the moving strips 182. in particular, the crimping die 404 is mounted on the drum a circumferential distance preferably equal to the distance between junctures 196 on each strip 182. The crimping die 404 utilizes a set of corrugated teeth 410 mounted on the outer edge of the die 404 in a longitudinally spaced fashion. Each tooth extends tangentially to the length of the die 404 and is of approximately trapezoidal cross-section. The crimping die 404 contacts the strips 182 after the die 402 has completed stage one of the process. The teeth 410 interface with the indented area 281 and crimps the top and bottom portions of the doughs together in a secure fashion by forming corrugations between the top and bottom dough portions. As shown in FIGS. 13*d*–*e* the indented portion 281 is transformed into a corrugated sealed area 381.

Finally, in stage three of the process, a cutting die 406 contacts the corrugated portion 381 of the dough strip 182. The die 406 is mounted similarly to dies 402 and 404 on the rotating drum. The outer edge of the cutting die incorporates a slightly curved edge 414 and a cutting blade 412. When the die 406 contacts the corrugated portion 381 of each strip 182, the curved portion 414 peens or flattens the crimped portion 381 and cuts the strip 182 at the juncture line 196 to separate each particular folded shape 82 from the strip 182.

Figures 14A, 14B:
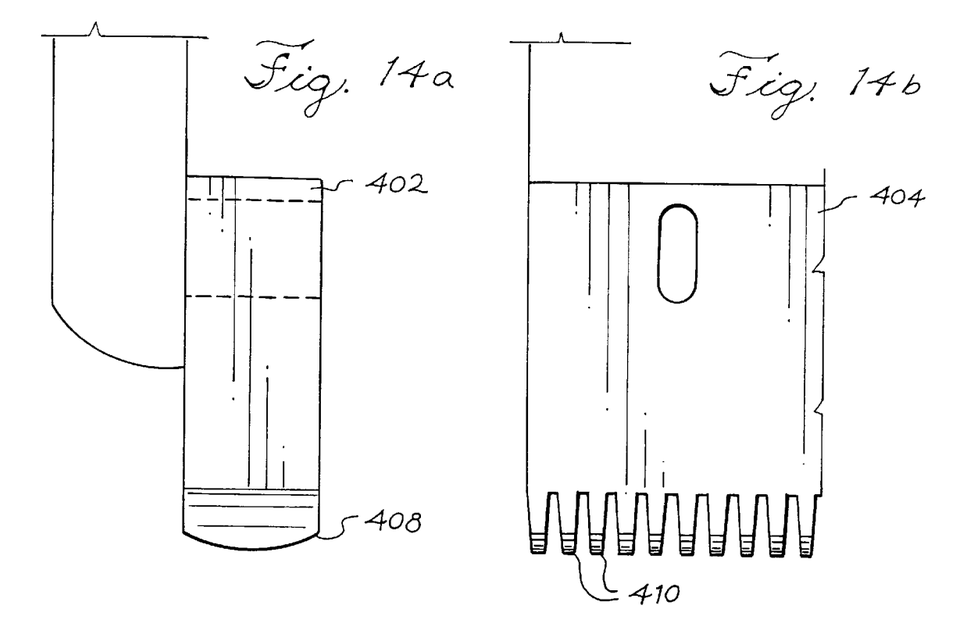
FIG. 14a is a detailed side view of the toots shown in FIGS. 13a and 13b.
FIG. 14b is a detailed front view of the tools shown in FIGS. 13a and 13b.

FIG. 14 shows in closer detail the indentation die 402 and the crimping die 404. As described above, the indentation die 402 incorporates curved edge 408, and the crimping die 404 incorporates the teeth 410. Preferably, these dies are formed from aluminum. With respect to the indentation die, the radius of curvature of the outer edge 408 is preferably 30 inches. With respect to the crimping die 404, the width of each of tooth 410 is preferably 0.08 inches. The spacing between each tooth 410 is preferably 0.22 inches.

The folding and sealing of the shape 82 with the flanges 102 and 100 in the overlapping fashion shown in the figures results in a pastry having a recessed area 124 defined by the folded flanges 102 and 100 and edgewalls 114. The recessed area provides adequate packet to hold filling 112, and the edgewalls 114 provide longitudinal stability to the final product after baking. This allows the product to be lifted from one of the ends 96 or 98 by the user without undue difficulty.

Figure 15:
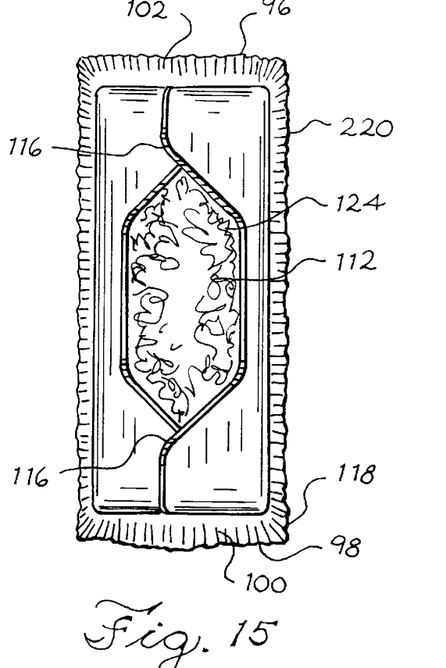
FIG. 15 shows an alternative embodiment of the finished folded pastry product of the present invention.

The cut and folded shape 82 is next passed through a reformer as shown in box 68 of FIG. 5. The reformer reconstitutes that the overall shape of the folded shape 82 into a rectangle and insures the removal of any further dough scraps after crimping and cutting. As an alternative, as shown in FIG. 15, a pinched perimeter 118 may be formed around the entire shape 82 to ensure the stability of the product and the retaining of the filling within the recessed area.

Once the folding of the shapes 82 has been completed, the filled or unfilled dough shapes 82 are sprayed with a fine water mist at box 70 of FIG. 5 and baked in gas impingement ovens set between 350 and 525 degrees Fahrenheit for 2–4 minutes (72). Before being placed in the ovens, the shapes 82 are spaced evenly on a conveyor to promote even baking.

The combination of the flaky laminated dough sheet with the particular folded structure as described herein provides a structurally stable, yet flaky and appealing product. A variety of fillings may be used, from pizza fillings to sweet pie fillings, to provide a wide array of products to the consumer while maintaining a minimum number of production operations. Thus, sweet fillings and pizza fillings may be deposited into the cut shapes on a single production line.

Furthermore, the combination of the laminated dough sheet and folded structure allows for the product to be efficiently and acceptably heated within a microwave oven or a conventional oven. The cooked product is rigid and easy to handle by the consumer, and the crust resulting from the laminated dough is exceptionally pleasing to the palate.

Of course, it should be understood that a wide range of changes and modifications can be made to the embodiment of the method and product described above. For example, variations in the ingredients, temperature parameters, layering steps, folding steps and filling steps may be incorporated while remaining within the contemplated scope of the present invention. Furthermore, variations in the overall shape of the folded pastries may also be incorporated while remaining within the contemplated scope of the invention. It is therefore intended that the foregoing detailed description be regarded as illustrative rather than limiting and that it be understood that it is the following claims, including all equivalents, which are intended to define the scope of this invention.

What is claim is:

1. A folded pastry product comprising:

a layered dough pastry shape having a plurality of uniform, alternating layers of a fat and dough;

said shape defining a first end and a second end, at least a first flanged portion adjacent said first end and at least a second flanged portion adjacent said second end, each of said flanged portions including at least a pair of flanges, a narrowed area having side edges extending between said first and second flanged portions;

said shape being folded and sealed to provide a recessed area for holding a filling, said recessed area defined by the overlapping of said flanges of said first end and the overlapping of said flanges of said second end, said recessed area also defined by upturned side edges of said narrowed portion.

2. The folded pastry product of claim 1 further comprising a filling retained within said recessed area.

3. The folded pastry product of claim 1 wherein said shape interlocks with other shapes of the same shape to minimize the amount of space between said shapes.

4. The folded pastry product of claim 3 wherein said shape includes a corrugated portion at each of said ends.

5. The folded pastry product of claim 4 wherein:

said flanges of said first and said second flanged portions each include a straight edge extending perpendicularly to an edge of said first end and a tapered edge extending between said straight edge and a side edge of said narrow portion.

6. A folded pastry product comprising:

a layered dough pastry shell formed by incorporating a plurality of uniform, alternating layers of a fat and dough into a sheet, cutting a shape from said sheet to defining a first end and a second end, a first flanged portion adjacent said first end and a second flanged portion adjacent said second end, each of said flanged portions including at least a pair of flanges, a narrowed area having side edges extending between said first and second flanged portions, forming said shell by folding said flanges of said first end in an overlapping fashion and folding the said flanges of said second end in overlapping fashion; and a substantially homogeneous filling positioned, over said narrowed area.

7. The folded pastry product of claim 6 further comprising a pinched rim positioned peripherally around said pastry shell.

8. The folded pastry product of claim 7 wherein said filling further comprises a tomato sauce.

9. The folded pastry product of claim 8 further comprising a topping located substantially within said narrowed area, said topping including a cheese product.

10. The folded pastry product of claim 8 wherein said dough is formed by folding a single layer of margarine within a sheet of rolled, substantially homogeneous dough and stretching, folding and rolling said dough to produce alternating layers of fat and dough.

11. The folded pastry product of claim 10 wherein said product is baked along with said topping.

* * * * *